Figure 2:
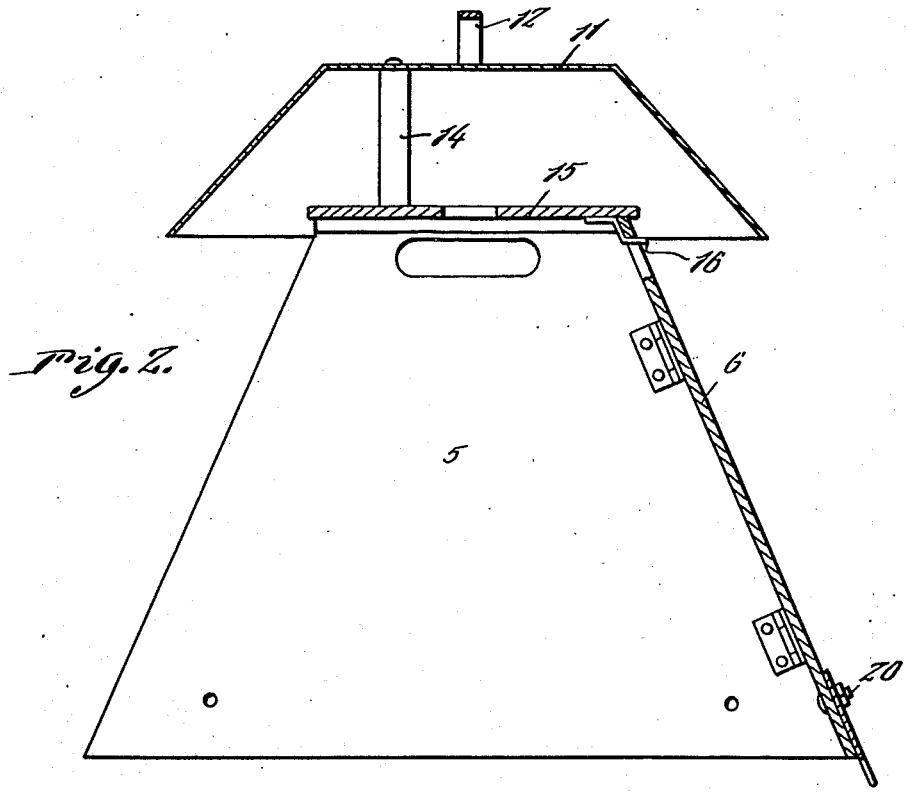

March 8, 1932.  C. WAGLIE  1,848,287
GLARE SHIELD FOR ELECTRIC TORCH WORK
Filed Jan. 28, 1930    2 Sheets-Sheet 1
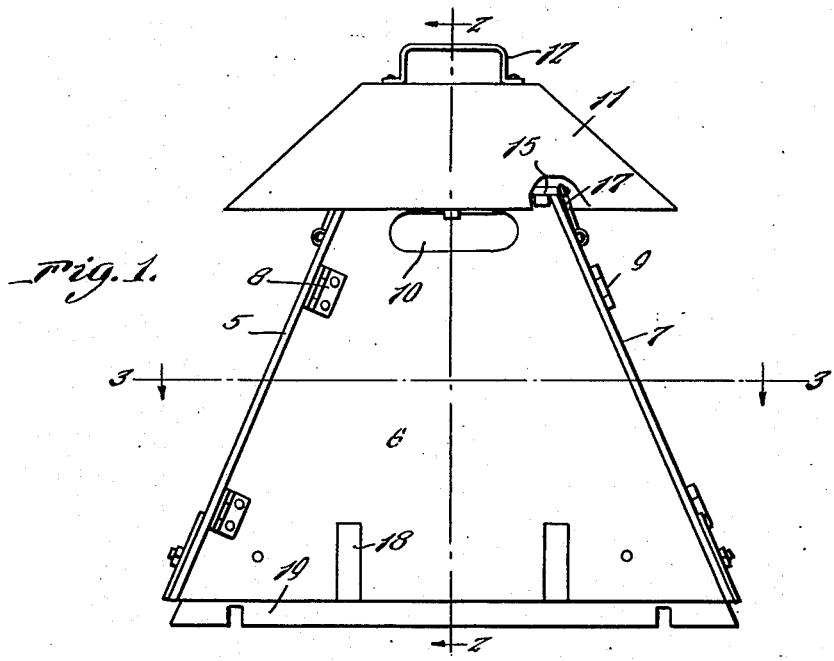
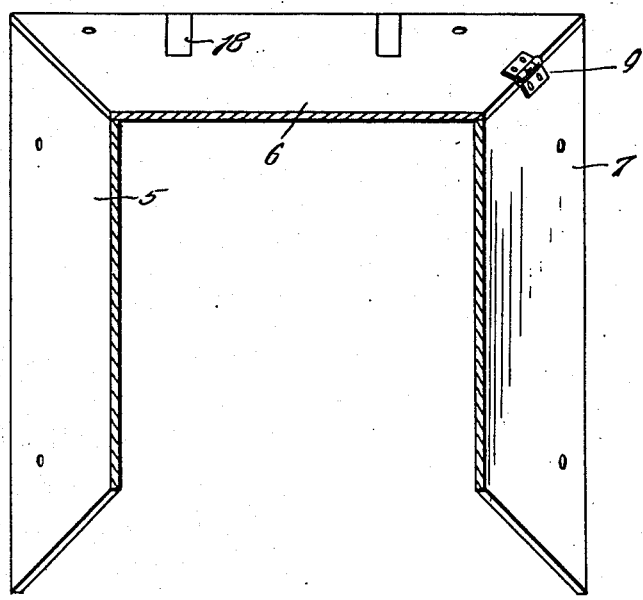
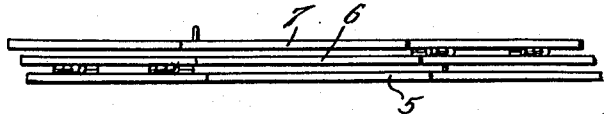
Inventor
Carl Waglie
By Clarence A. O'Brien
Attorney March 8, 1932. C. WAGLIE 1,848,287
GLARE SHIELD FOR ELECTRIC TORCH WORK
Filed Jan. 28, 1930 2 Sheets-Sheet 2

Inventor
Carl Waglie

By Clarence A. O'Brien
Attorney

Patented Mar. 8, 1932

1,848,287

UNITED STATES PATENT OFFICE

CARL WAGLIE, OF BALTIMORE, MARYLAND, ASSIGNOR OF ONE-HALF TO FREDERICK W. HENNING, OF BALTIMORE, MARYLAND

GLARE SHIELD FOR ELECTRIC TORCH WORK

Application filed January 28, 1930. Serial No. 424,123.

The present invention relates to a shield particularly adapted for electric torch work and the prime object of the invention resides in the provision of a device of this nature which is foldable so as to form a compact structure for storage and transportation purposes.

Another very important object of the invention resides in the provision of a shield of this nature which is easy to manipulate, assemble and disassemble, thoroughly efficient and reliable in use.

Another very important object of the invention resides in the provision of a shield of this nature which is simple in construction, inexpensive to manufacture, strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 5:
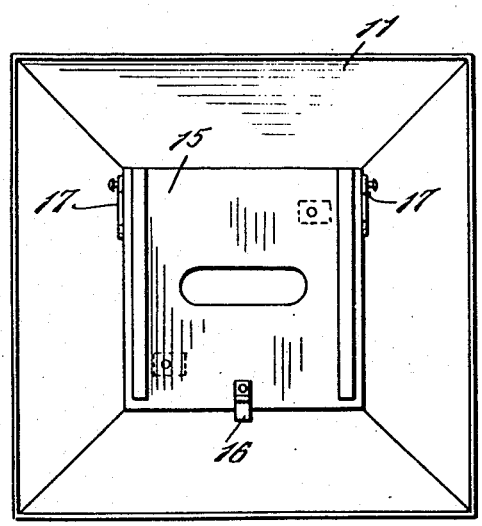

In the drawings:

Figure 1 is a side elevation of a shield embodying the features of my invention, Figure 2 is a vertical section therethrough taken substantially on the line 2—2 of Figure 1, Figure 3 is a horizontal section therethrough taken substantially on the line 3—3 of Figure 1, Figure 4 is a detail view of the walls in the shield folded, and Figure 5 is a bottom plan view of the hood.

Referring to the drawings in detail it will be seen that numerals 5, 6 and 7 denote walls of trapezoidal formation to form the shield. Inside hinges 8 connect the walls 5 and 6 while outside hinges 9 connect the walls 6 and 7 thereby allowing the walls to be extended as is shown to advantage in Figures 1, 2, 3 and 5 or folded in compact relationship one over the other as is clearly shown in Figure 4.

The walls are provided with ventilating and hand holes 10 at the tops thereof. The hood 11 has a handle 12 and inside is provided with brackets 14 for supporting top plate 15 which is adapted to rest on the upper edges of the plates 5, 6 and 7 and has an angular member 16 to engage in the hand hole 10 of the wall 6 while hook and eye structures 17 are utilized for engaging the plate 15 to the walls 5 and 7.

Magnets 18 are incorporated in the bottom portion of the walls so that the shield may be mounted on iron or steel work in a convenient manner as the purpose may demand.

In order that the shield may be more readily mounted on different steel or iron work adjustable plates 19 are mounted on the lower portions of the plates 5, 6 and 7 being adjustably mounted by means of bolts 20 so that the plate may be extended downwardly at the lower edges of the walls as may be found necessary in mounting the shield in different conditions of work.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A welding shield comprising a casing adapted to be placed around the welding job and having its front open and the top of the casing having an opening therein, an upright on the top of the casing, and a hood supported by said upright in spaced relation from the top part of the casing.

2. A welding shield of the class described comprising a casing adapted to be placed around the welding job and comprising a rear wall forming member and a pair of side wall forming members, said members being hingedly connected together whereby they can be folded one upon the other, a top forming plate resting on the upper ends of the wall forming members and detachably connected therewith, said plate having an opening therein, an upright on said top forming plate, a hood supported by said upright in spaced relation from the upper part of the casing.

3. A welding shield comprising a casing adapted to be placed around a welding job and having its top open and a hood disposed over the casing and supported from the casing in spaced relation from the top part of the casing.

In testimony whereof I affix my signature.

CARL WAGLIE.